United States Patent
Latzina et al.

(10) Patent No.: US 10,452,255 B2
(45) Date of Patent: Oct. 22, 2019

(54) LOGICAL SET OPERATIONS

(71) Applicant: SAP SE, Walldorf (DE)

(72) Inventors: Markus Latzina, Wiesenbach (DE); Slavin Donchev, Mannheim (DE)

(73) Assignee: SAP SE, Walldorf (DE)

( * ) Notice: Subject to any disclaimer, the term of this patent is extended or adjusted under 35 U.S.C. 154(b) by 350 days.

(21) Appl. No.: 15/372,633

(22) Filed: Dec. 8, 2016

(65) Prior Publication Data

US 2018/0164972 A1   Jun. 14, 2018

(51) Int. Cl.
*G06F 3/0486* (2013.01)
*G06F 3/0482* (2013.01)

(52) U.S. Cl.
CPC .......... *G06F 3/0486* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 2005/0187911 A1* | 8/2005 | Tunning | G06F 16/90332 |
| 2008/0154869 A1* | 6/2008 | Leclercq | G06F 16/90328 |
| 2008/0307345 A1* | 12/2008 | Hart | G06F 11/1448 715/769 |
| 2011/0242601 A1* | 10/2011 | Takahashi | G06F 3/1205 358/1.15 |
| 2012/0030594 A1* | 2/2012 | Yokoyama | G06F 3/1454 715/765 |
| 2012/0066257 A1* | 3/2012 | Hosotsubo | G06F 16/93 707/772 |
| 2014/0026099 A1* | 1/2014 | Andersson Reimer | G06F 3/0482 715/825 |
| 2014/0096075 A1* | 4/2014 | King | G06F 16/58 715/800 |
| 2014/0344264 A1* | 11/2014 | Kenna | G06F 16/90328 707/731 |
| 2015/0248335 A1* | 9/2015 | Young | G06F 16/168 707/654 |

\* cited by examiner

*Primary Examiner* — Toan H Vu
(74) *Attorney, Agent, or Firm* — Buckley, Maschoff & Talwalkar LLC

(57) ABSTRACT

According to some embodiments, a logical set operator platform may recognize that a user has selected, via a graphical user interface, a sub-set of items from an item set associated with a source application. The logical set operator platform may then receive an indication from the user that a selected logical set operation is to be applied to the item set and to the selected sub-set of items, wherein the selected logical set operation is not implemented by the source application. The selected logical set operation may be applied to create a resulting item set based on the selected sub-set of items, and it then may be arranged for an indication of the resulting item set to be provided to a receiving application.

17 Claims, 13 Drawing Sheets

LOGICAL SET OPERATIONS

FIELD

Some embodiments are associated with ways in which items and/or sub-sets of items can be selected by a user. In particular, some embodiments describe ways in which a user may utilize logical set operations for source applications.

BACKGROUND

An application may provide a list or set of items to a user. For example, an application might graphically display a set of icons each representing a different file, folder, business object, etc. Moreover, a user might want to select some or all of the items and perform an action on the selected items. For example, a user might select a sub-set of the items and indicate that he or she would like to copy the items, delete the items, print the items, etc. An application designer can program this type of functionality directly into an application at design time. For example, the application designer can include code in the application that lets the user select various items and act on those selections as a group. Similarly, the application designer can include code to support various logical set operations (e.g., to invert a user's selection such that all selected items become unselected and all unselected items become selected). In some cases, however, this type of functionality is not included in an application. Moreover, changing the types of logical set operations that are available to users (e.g., to include a "Select All" option) can be a difficult and time-consuming task (e.g., requiring extensive programming changes, re-testing of code, etc.).

It may therefore be desirable to provide systems and methods to facilitate ways in which items and/or sub-sets of items can be selected by a user for a source application in an efficient and flexible manner.

SUMMARY OF THE INVENTION

According to some embodiments, systems, methods, apparatus, computer program code and means are provided to facilitate ways in which items and/or sub-sets of items can be selected by a user for a source application in an efficient and flexible manner. In some embodiments, a logical set operator platform may recognize that a user has selected, via a graphical user interface, a sub-set of items from an item set associated with a source application. The logical set operator platform may then receive an indication from the user that a selected logical set operation is to be applied to the item set and to the selected sub-set of items, wherein the selected logical set operation is not implemented by the source application. The selected logical set operation may be applied to create a resulting item set based on the selected sub-set of items, and it then may be arranged for an indication of the resulting item set to be provided to a receiving application.

Some embodiments comprise: means for recognizing that a user has selected, via a graphical user interface, a sub-set of items from an item set associated with a source application; means for receiving an indication from the user that a selected logical set operation is to be applied to the item set and to the selected sub-set of items, wherein the selected logical set operation is not implemented by the source application; means for applying the selected logical set operation to create a resulting item set based on the selected sub-set of items; and means for arranging for an indication of the resulting item set to be provided to a receiving application.

In some embodiments, a communication device associated with a back-end application computer server exchanges information with remote devices. The information may be exchanged, for example, via public and/or proprietary communication networks.

Technical effects of some embodiments of the invention are improved and computerized ways to facilitate ways in which items and/or sub-sets of items can be selected by a user for a source application in an efficient and flexible manner. With these and other advantages and features that will become hereinafter apparent, a more complete understanding of the nature of the invention can be obtained by referring to the following detailed description and to the drawings appended hereto.

DETAILED DESCRIPTION

The following description is provided to enable any person in the art to make and use the described embodiments and sets forth the best mode contemplated for carrying out some embodiments. Various modifications, however, will remain readily apparent to those in the art.

An application, such as a spreadsheet application, word processor, business enterprise application, etc. may provide a list or set of "items" to a user. As used herein, the term "item" may refer to any object that is selectable by a user, such as an identifier, file, folder, business object, etc. Moreover, a user might want to select some or all of the items and perform an action on the selected items (e.g., to export the items, process the items, etc.). In some cases, an application designer can program this type of functionality directly into an application at design time (e.g., by including code in the application that lets the user select various items and act on those selections as a group) along with code to support various logical set operations (e.g., to invert a user's selection). In some cases, however, this type of functionality is not included in an application. Moreover, changing the types of logical set operations that are available to users (e.g., to include a "Select All" option) can be a difficult and time-consuming task (e.g., requiring extensive programming changes, re-testing of code, etc.).

Figure 1:
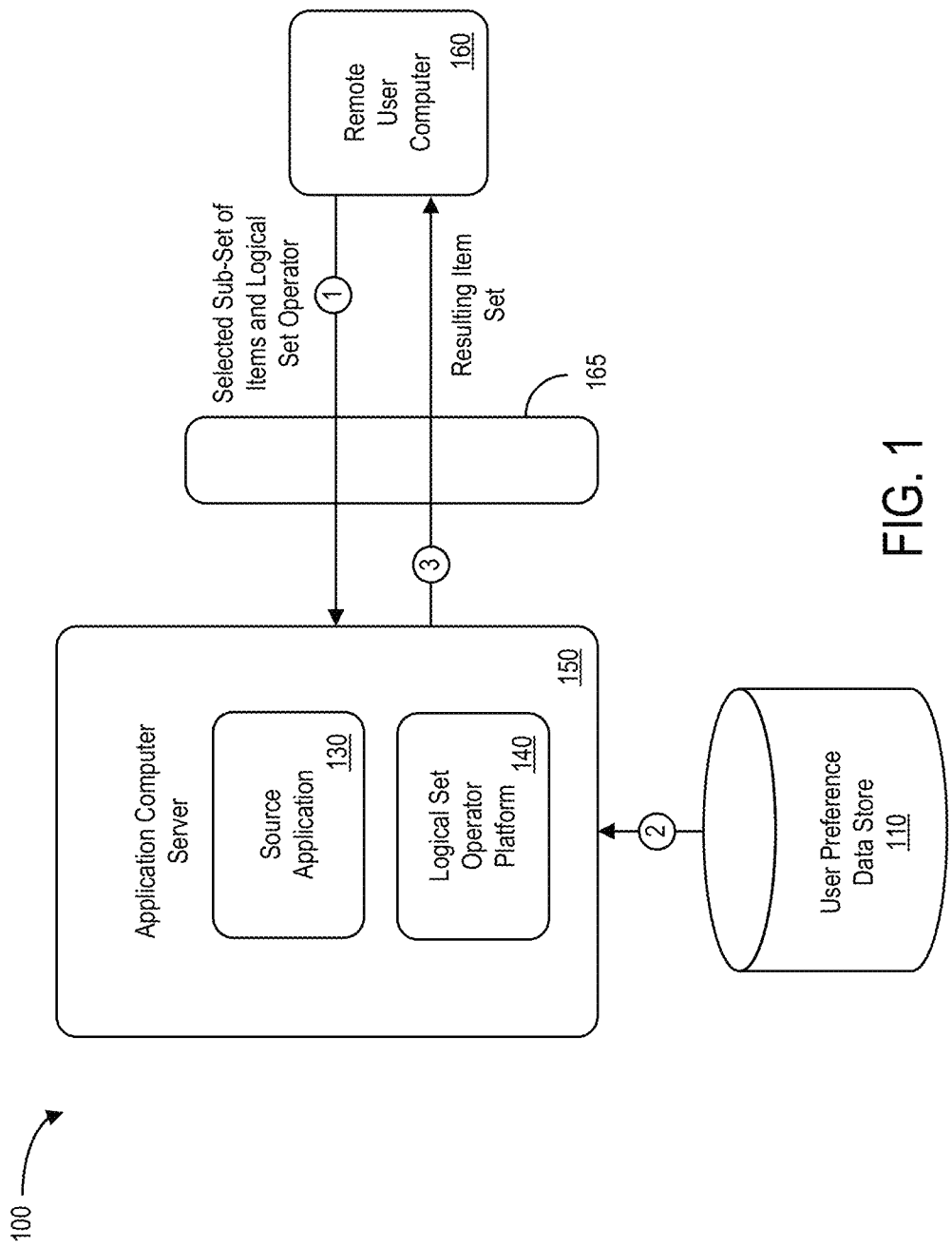
FIG. 1 is a high level block diagram of a computer system in accordance with some embodiments.

It may therefore be desirable to provide systems and methods to facilitate ways in which items and/or sub-sets of items can be selected by a user for a "source application" in an efficient and flexible manner. A used herein, the phrase "source application" may refer to, for example, a program created at design time without incorporating or anticipating embodiments described herein. FIG. 1 is a high-level block diagram of a system 100 according to some embodiments of the present invention. In particular, the system includes a user preference data store 110 that provides information to an application computer server 150. The application computer server 150 may also exchange information with a remote user computer 160 (e.g., via a firewall 165) and/or executing a source application 130. According to some embodiments, a logical set operator platform 140 executes at the application computer server 150 to facilitate an efficient and flexible ability to select items and/or sub-sets of items. According to some embodiments, the application computer server 150 and/or logical set operator platform 140 might be associated with a third-party, such as a vendor that performs a service for an enterprise.

The application computer server 150 might be, for example, associated with a Personal Computer ("PC"), laptop computer, smartphone, an enterprise server, a server farm, and/or a database or similar storage devices. According to some embodiments, an "automated" or "semi-automated" application computer server 150 and/or logical set operator platform 140 may process information that is provided to the remote user computer 160. As used herein, the term "automated" may refer to, for example, actions that can be performed with little (or no) intervention by a human.

As used herein, devices, including those associated with the application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The application computer server 150 may store information into and/or retrieve information from the user preference data store 110. The user preference data store 110 might, for example, store a set of electronic records representing how individual users (or types of users) would like to utilize logical set operations in connection with source applications 130. The user preference data store 110 may also contain information about past and current interactions with parties, including those associated with remote user computers 160 (e.g., to let the system 100 learn over time how users or types of users like to utilize logical set operations). The user preference data store 110 may be locally stored or reside remote from the application computer server 150. As will be described further below, the user preference data store 110 may be used by the application computer server 150 to automatically present logical set operation options in connection with one or more source applications 130. Although a single application computer server 150 is shown in FIG. 1, any number of such devices may be included. Moreover, various devices described herein might be combined according to embodiments of the present invention. For example, in some embodiments, the application computer server 150 and user preference data store 110 might be co-located and/or may comprise a single apparatus.

According to some embodiments, the system 100 may facilitate a user's selection of items and/or sub-sets of items via the application computer server 150. For example, at (1) a user at a remote user computer 160 might select a sub-set of items from an item set associated with the source application 130. The logical set operator platform 140 may then access information in the user preference data store 110 at (2) and determine whether or not a logical set operation functionality is available in connection with that user and/or that source application 130 (and, in some cases, what types of logical set operations will be available). This information may then be used to process and transmit data to the remote user computer 160 at (3) for display and/or to be used in connection with selection of one or more items. According to some embodiments, the remote user computer 160 may represent a target user computer or even a target application. That is, the source application may be considered a first application and the target application may act as a second application that receives input by way of user-chose application of any kind of logical set operation. Note that the logical set operator platform 140 may, in some embodiments, tightly and seamlessly interact with existing applications such that minimal setup requirements are necessary. Instead, the logical set operator platform 140 may work with applications, plugins, and/or other functional elements so as to be available to users with minimal effort.

In some embodiments described herein, the system 100 may include applications that are released and able to run on various combinations of database systems, Operating Systems ("OSs"), virtualization layers and cloud services, such as Infra-Structure as a Service ("IaaS") implementations. Moreover, embodiments might include real time analytics, interactive data exploration, and/or an application platform associated with, for example, the High-performance ANalytic Appliance ("HANA") in-memory, column-oriented, relational database management system developed and marketed by SAP SE®. Such an application platform might include, for example, an OnLine Analytical Processing ("OLAP") engine, a predictive engine, a spatial engine, application logic, a rendering platform, etc. A real-time data acquisition device may include landscape transformation, a replication server, and/or an event stream processor. According to some embodiments, an application platform and/or real-time data acquisition device may exchange information with transactional, analytical, online applications. An application platform may also exchange information with customer mobile applications (e.g., associated with mobile platforms), a business object suite (e.g., associated with exploration, reporting, dashboarding, predictive functions, and/or mobile versions), business objects data services, etc.

Figure 2:
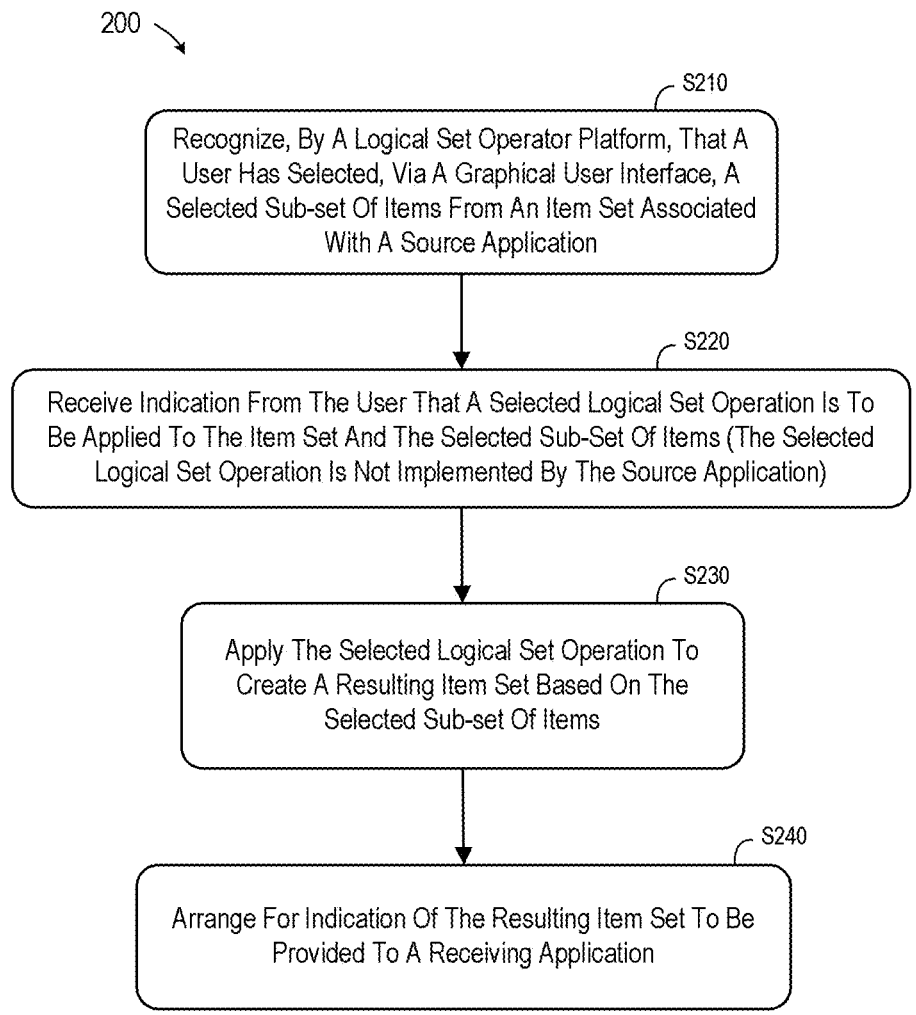
FIG. 2 is a flow diagram of a method according to some embodiments.

Note that the system 100 of FIG. 1 is provided only as an example, and embodiments may be associated with additional elements or components. According to some embodiments, the elements of the system 100 automatically facilitate the selection of items and/or sub-sets of items by a user. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a logical set operator platform may recognize that a user has selected, via a graphical user interface, a sub-set of items from an item set associated with a source application. For example, a user might utilize a computer pointer and mouse "click" to select item tiles, check off checkboxes located next to items in a list or table, etc. According to some embodiments, the item set may be associated with a list of items identifiers, a table of item identifiers, an array of item identifier tiles, etc. According to some embodiments, web pages may contain items from which objects may be gathered. For example, embodiments might represent a particular way of further processing data stemming from content scrapping (a common procedure for web-based content).

At S220, the logical set operator platform may receive an indication from the user that a selected logical set operation is to be applied to the item set and to the selected sub-set of items. Note that, according to some embodiments, the selected logical set operation is not implemented by the source application. Receiving this indication might include, for example, a graphical drag-and-drop operation from a graphical source container of the source application to a staging area container. According to some embodiments, the indication may further include a graphical drag-and-drop operation from a staging area container back to the graphical source container of the source application.

According to some embodiments, the received indication from the user includes selection or fixing of the selected logical set operation from a list of potential logical set operations. For example, the potential logical set operations might include an ALL operation such that the resulting item set includes all of the items in the item set and/or a NONE operation such that the resulting item set includes no items. As another example, the potential logical set operations might include a SELECTED operation such that the resulting item set includes only those items in the selected sub-set of items. Similarly, the potential logical set operations might include an ALL BUT SELECTED operation such that the resulting item set includes only those items in the item set that are not in the selected sub-set of items. Note that embodiments might include some, all, or any combination of potential logical set operations.

At S230, the selected (or user-chosen) logical set operation may be applied to create a resulting item set based on the selected sub-set of items. For example, the application of the selected logical set operation might be embedded dynamically and performed in any source application context. At S240, it may be arranged for an indication of the resulting item set to be provided to a receiving application. According to some embodiments, the source application acts as the receiving application and may then use the indication of the resulting item set to perform an action on the items within the resulting item set (e.g., the action might be associated with creating, reading, updating, deleting, etc.). According to other embodiments, the receiving application may be an application other than the source application (e.g., embodiments associated with an entity for maintaining and/or provisioning data on the user interface level).

According to some embodiments, a logical set operator platform may, prior to receiving the indication from the user that the selected logical set operation is to be applied at S230, verify a computing environment, a category of applications, a particular application, etc. For example, only certain logical set operators might be available to certain users, user types, applications, application types, etc. Moreover, according to some embodiments, user may subscribe to a logical set operator platform as a service (e.g., and indicate his or her logical set operation preferences when he or she subscribes to the service).

Note that embodiments might be associated with any type of logical set operation. For example, a selected logical set operation might be associated with a query expression. Consider, for example, a source application where each item in an item set has a characteristic field and associated characteristic field value (e.g., file size, file type, etc.). In this case, a query expression might be based at least in part on the characteristic field value (e.g., a user might choose to have the five files with the largest file sizes selected). According to some embodiments, a logical set operator platform may display a list of available characteristic fields to the user, in which case the user may select a characteristic field to be used for the query expression. In some embodiments, a logical set operator platform may access a plurality of item sets, and a logical set operation may be performed on the plurality of item sets (e.g., by executing a union operation, an intersection operation, a compliment operation, etc.).

The method of FIG. 2 might be implemented using any number of interactive user displays. For example, FIGS. 3 through 9 illustrate use of a graphical user interface in accordance with some embodiments.

Figure 3:
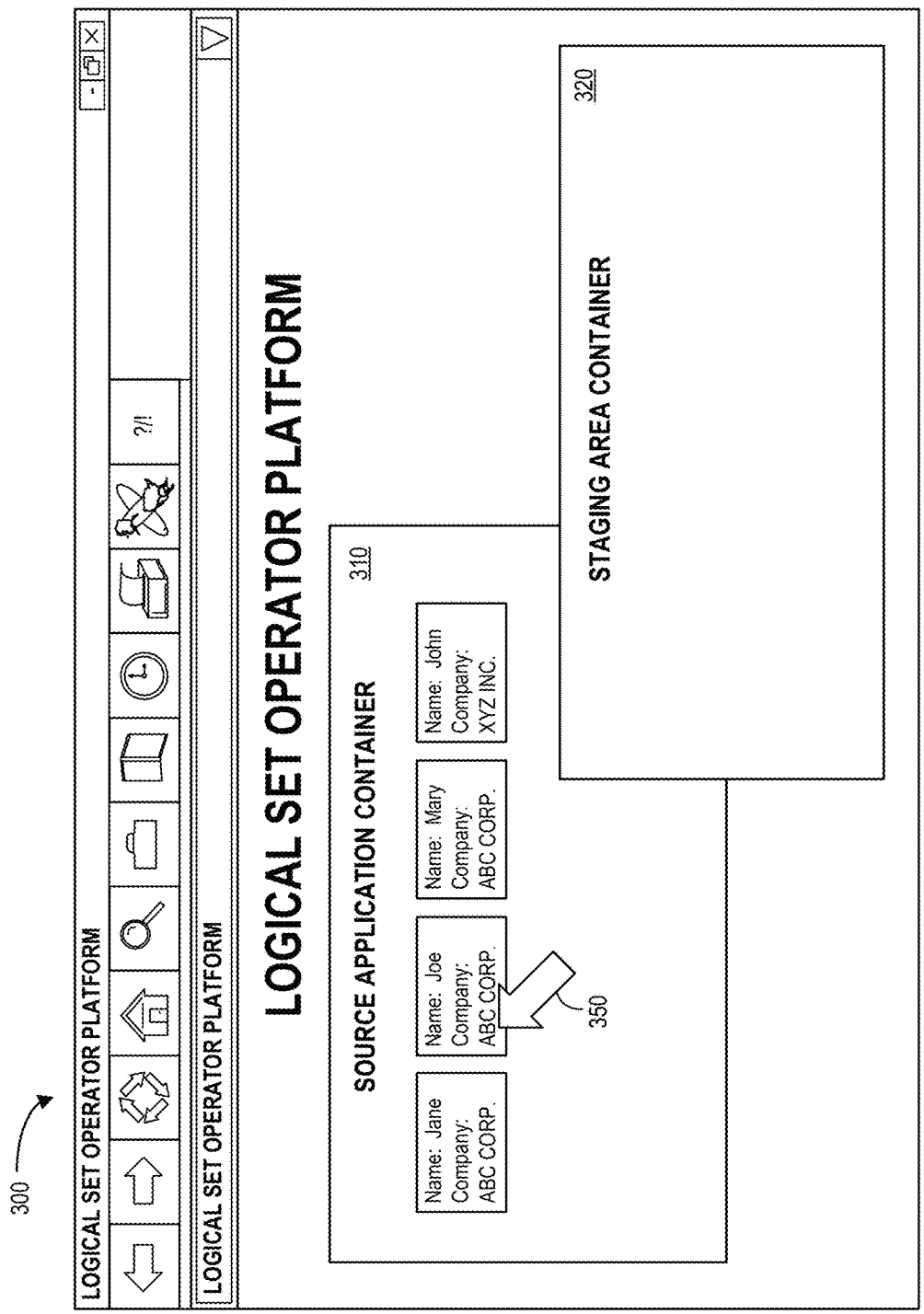
FIGS. 3 through 9 illustrate use of a graphical user interface in accordance with some embodiments.

As illustrated in FIG. 3, a logical set operator platform display 300 may include a source application container 310 and staging area container 320. As used herein, the term "container" may refer to a graphical display area associated with a particular program or function. The source application container 310 may include an item set having a number of items. As illustrated in FIG. 3, the source application container 310 has four items, each having two identifiers (e.g., Name and Company). According to some embodiments, a user may utilize a computer pointer 350 to click on and select various items to create a sub-set of selected items. For example, as illustrated in FIG. 4, a display 400 illustrates a source application container 410 where three of the four items have been selected by a user (that is, the items associated with the names "Jane," "Joe," and "John" have been selected by the user as shown by the darker boundaries in FIG. 4).

Figure 4:
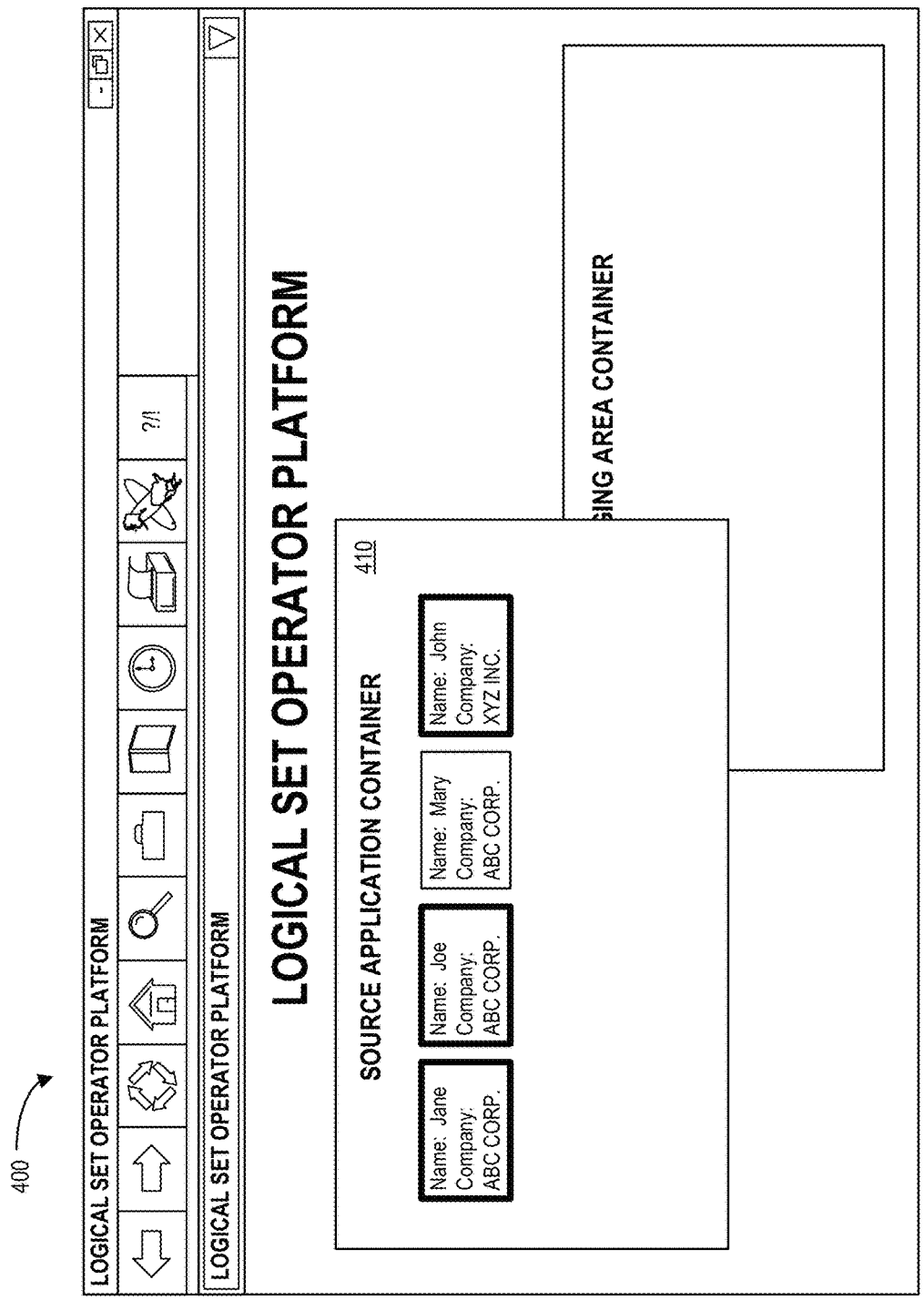
Figure 5:
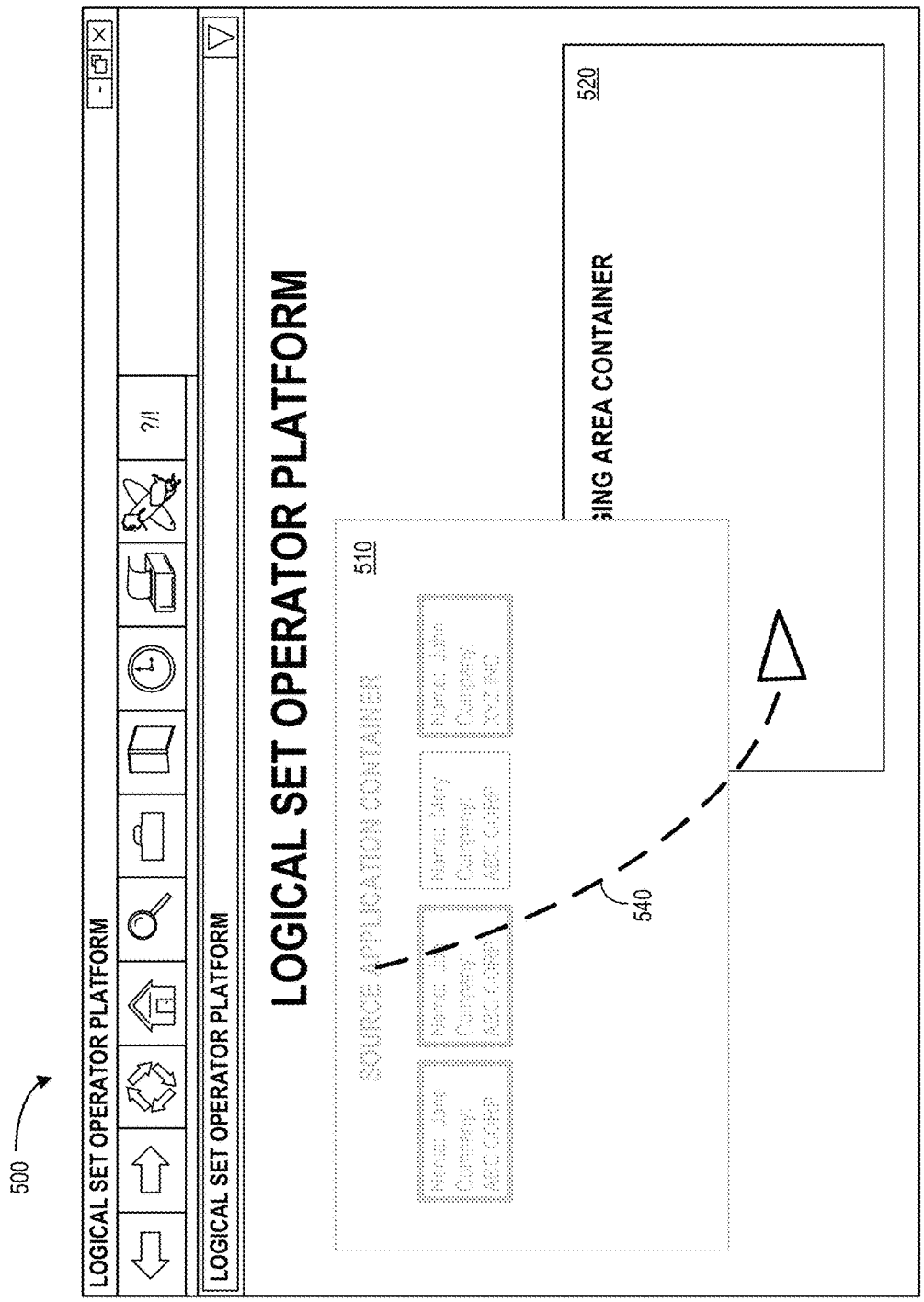
Figure 6:
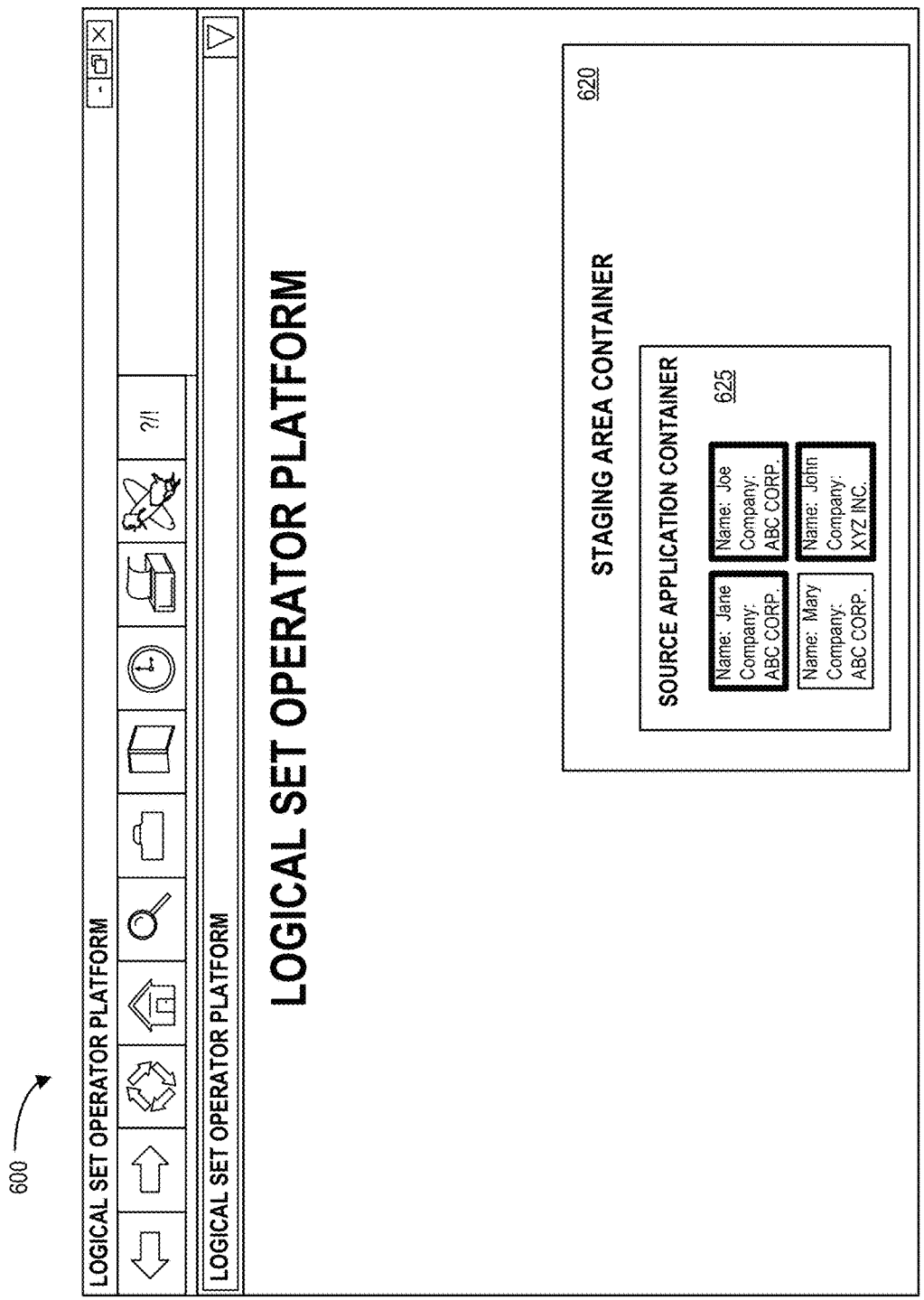
Figure 7:
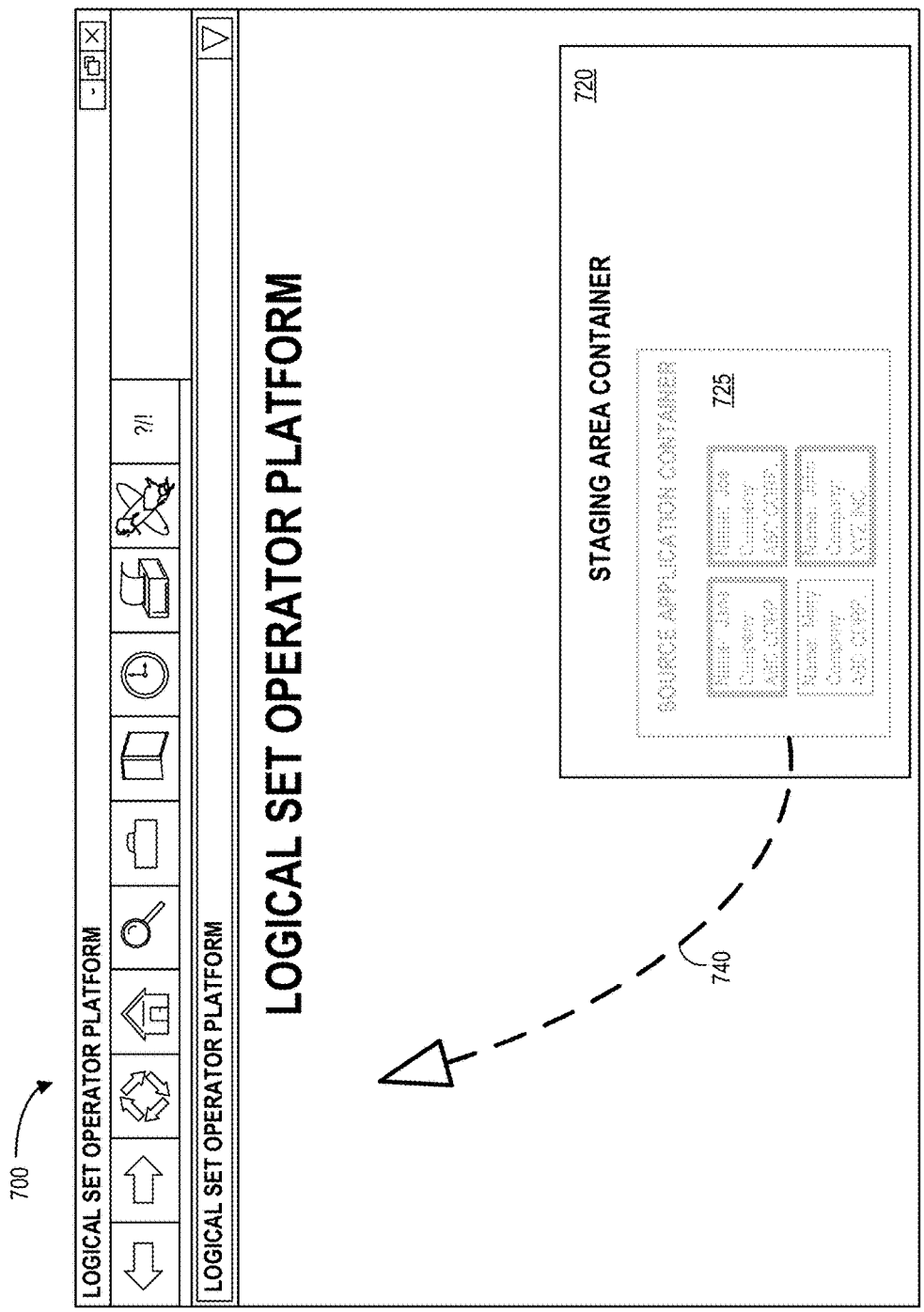

As illustrated in FIG. 5, a display 500 may be utilized by a user to drag-and-drop a source application container 510 onto a staging area container 520 (as shown by the dashed arrow 540 in FIG. 5). As a result, as illustrated in FIG. 6, a display 600 may then include a source application container 625 within a staging area container 620 (with the same three objects selected as were selected in FIG. 4). As illustrated in FIG. 7, a display 700 may be utilized by a user to drag-and-drop a source application container 725 back out of a staging area container 720 (as shown by the dashed arrow 740 in FIG. 7). This action might comprise, for example, an indication to a logic set operator platform that functionality should be invoked in accordance with any of the embodiments described herein.

Figure 8:
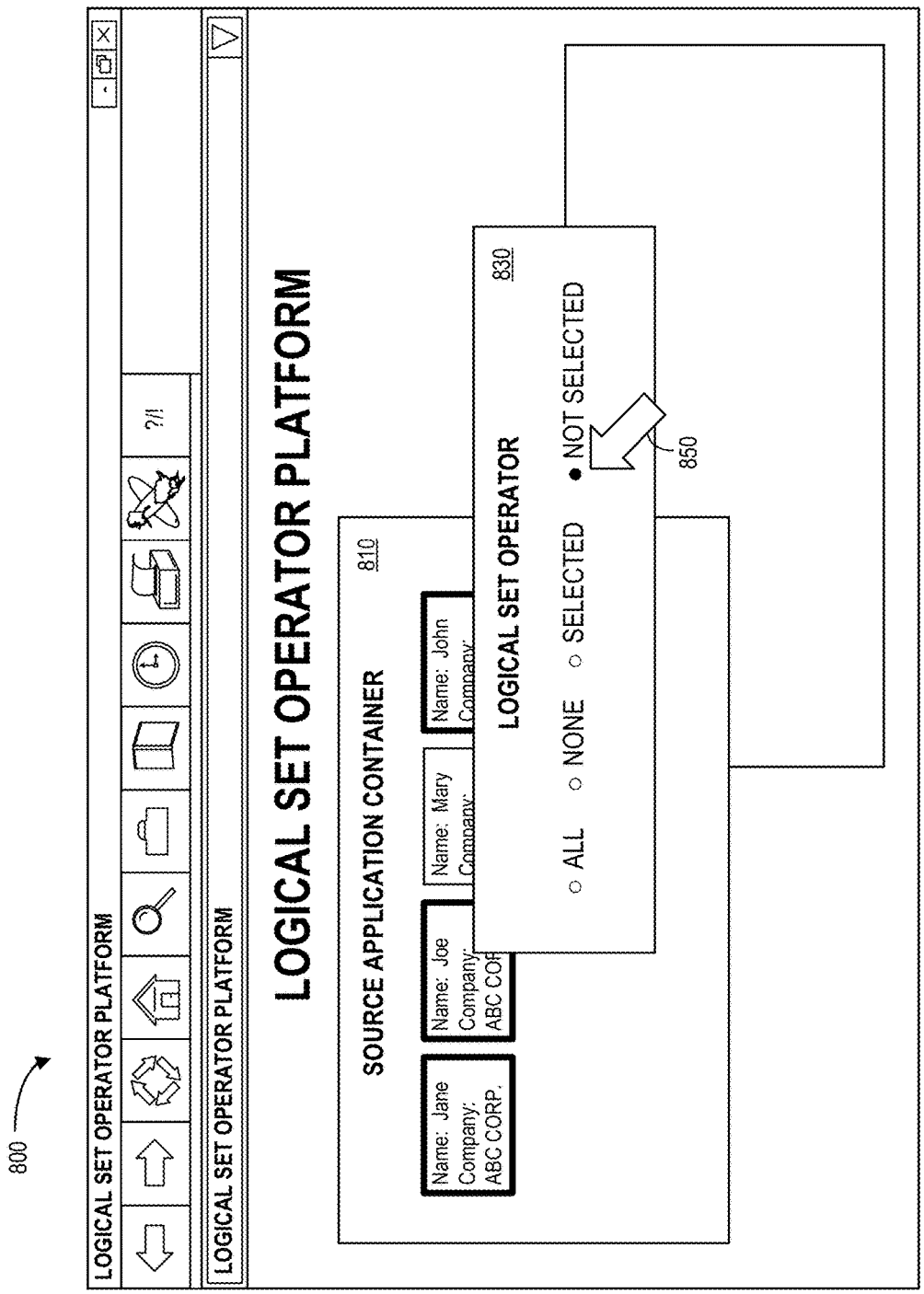
Figure 9:
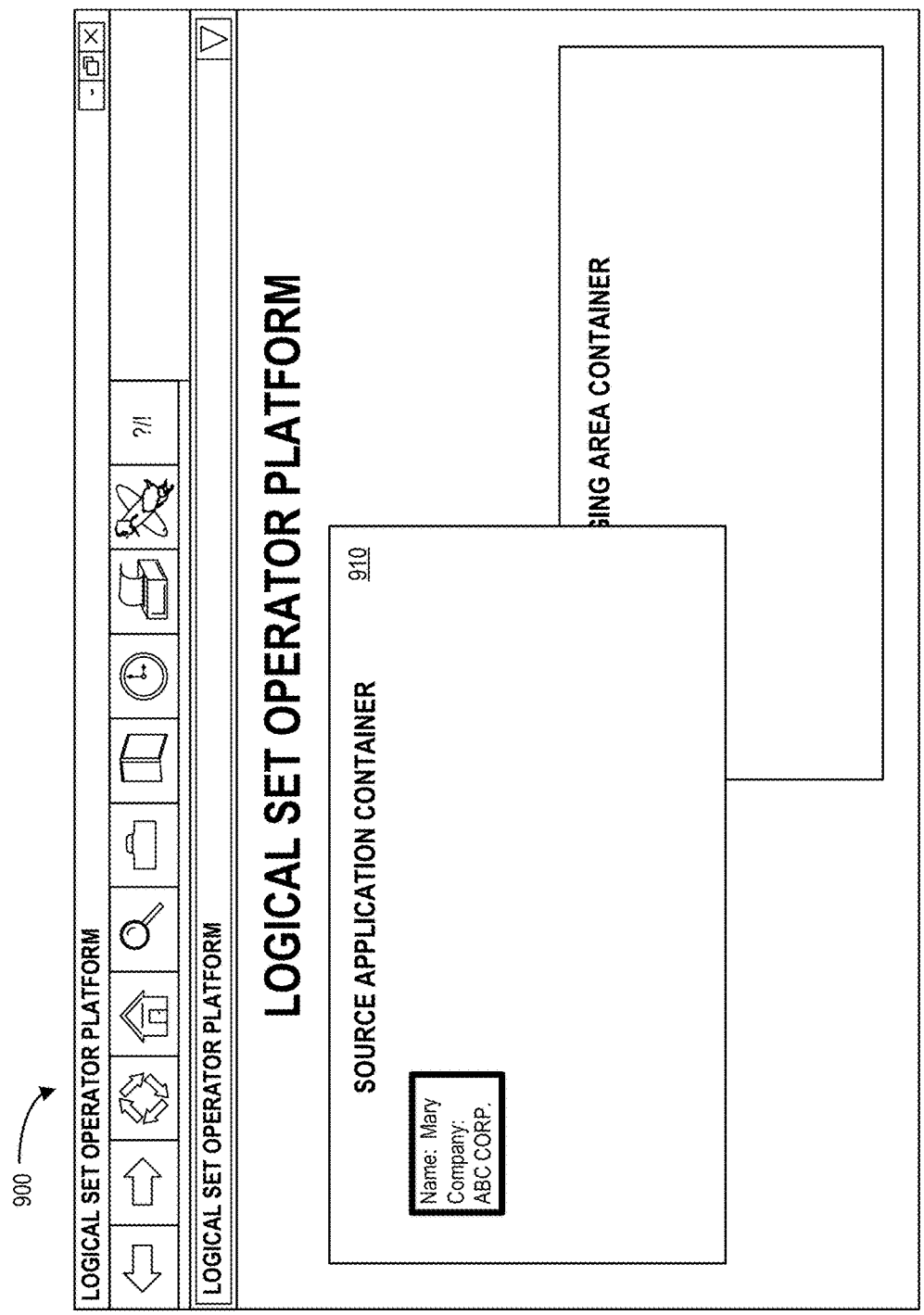

As illustrated in FIG. 8, a display 800 may include a source application container 810 with three of the four items selected (as were selected in FIG. 4). Moreover, the display 800 may include a presentation to user of a set of potential logical set operations 830 (e.g., ALL, NONE, SELECTED, NOT SELECTED, etc. as illustrated in FIG. 8). At this point, a user may utilize a computer pointer 850 to click on and select one of the potential logical set operators 830 (e.g., by choosing the NOT SELECTED operator as illustrated in FIG. 8). This operation may then be applied to the selected sub-set of items in the source application container 810. For example, as illustrated in FIG. 9, a display 900 may include a source application container 910 including the single item that was not selected by the user in FIG. 4 (that is, because the items associated with the names "Jane," "Joe," and "John" were selected in FIG. 4, now only the item associated with the name "Mary" is selected/present in FIG. 9). If, instead, the user had decided to choose the SELECTED operator in FIG. 8, the source application container 910 would include the three items that had been selected in FIG. 4 (that is, "Jane," "Joe," and "John").

Figure 10:
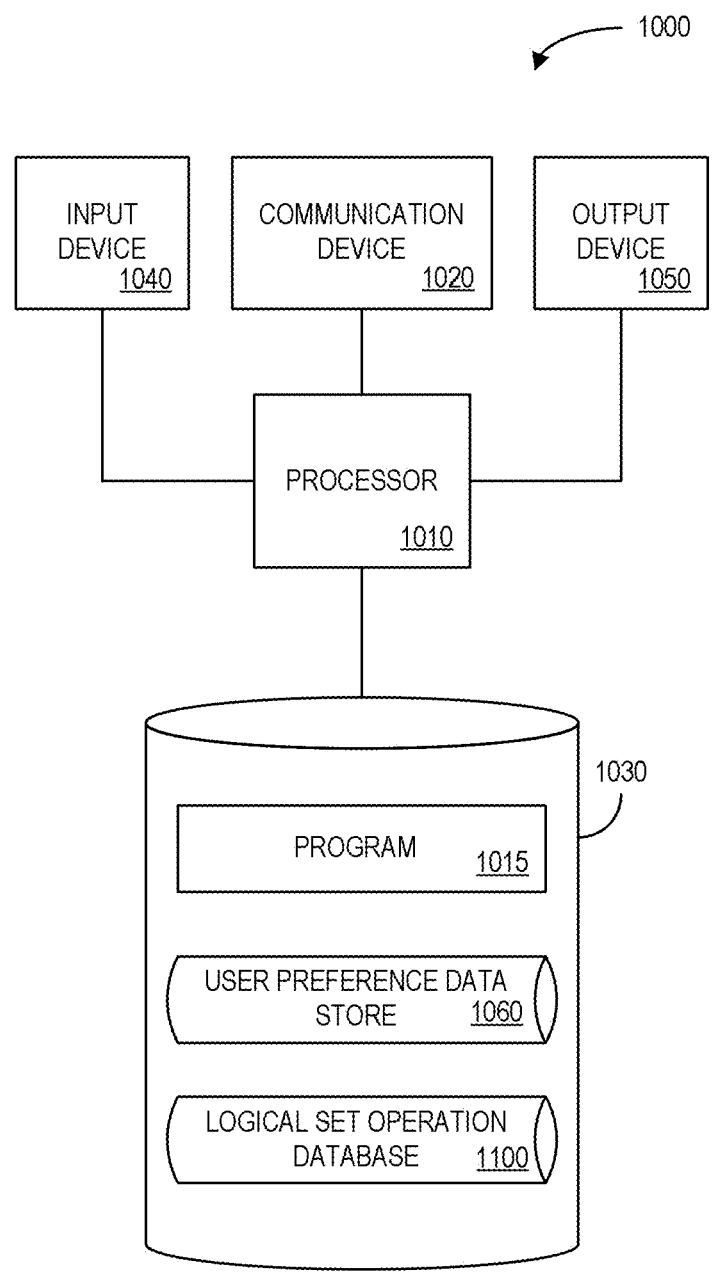
FIG. 10 is a high level diagram of an apparatus or platform in accordance with some embodiments.

Embodiments described herein may comprise a tool or plug-in that facilitates the selection of items and/or sub-sets of items by a user. For example, FIG. 10 illustrates a logical set operator apparatus or platform 1000 that may be, for example, associated with the system 100 of FIG. 1. The logical set operator platform 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote user devices (e.g., PCs and smartphones). Note that communications exchanged via the communication device 1020 may utilize security features, such as those between a public internet user and an internal network of the insurance enterprise. The security features might be associated with, for example, web servers, firewalls, and/or PCI infrastructure. The logical set operator platform 1000 further includes an input device 1040 (e.g., a mouse and/or keyboard to enter information about logical operations, user roles, etc.) and an output device 1050 (e.g., to output reports regarding user preferences and/or overall system utilization).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1015 and/or an existing association review tool or application for controlling the processor 1010. The processor 1010 performs instructions of the program 1015, and thereby operates in accordance with any of the embodiments described herein. For example, the processor 1010 may recognize that a user has selected, via a graphical user interface, a sub-set of items from an item set associated with a source application. The processor 1010 may then receive an indication from the user that a selected logical set operation is to be applied to the item set and to the selected sub-set of items, wherein the selected logical set operation is not implemented by the source application. The selected logical set operation may be applied by the processor 1010 to create a resulting item set based on the selected sub-set of items. The processor 1010 may then arrange for an indication of the resulting item set to be provided to a receiving application (either the source application or another target application which can then perform an action using the resulting item set).

The program 1015 may be stored in a compressed, uncompiled and/or encrypted format. The program 1015 may furthermore include other program elements, such as an operating system, a database management system, and/or device drivers used by the processor 1010 to interface with peripheral devices.

As used herein, information may be "received" by or "transmitted" to, for example: (i) the logical set operator platform 1000 from another device; or (ii) a software application or module within the logical set operator platform 1000 from another software application, module, or any other source (including, for example, web pages, web content, etc.).

In some embodiments (such as shown in FIG. 10), the storage device 1030 further stores a user preference data store 1060 (e.g., associated with different users, types of users, user roles, types of source applications, etc. and what logic set operators should be available in various situations) and a logical set operation database 1100. An example of a database that might be used in connection with the logical set operator platform 1000 will now be described in detail with respect to FIG. 11. Note that the database described herein is only an example, and additional and/or different information may be stored therein. Moreover, various databases might be split or combined in accordance with any of the embodiments described herein. For example, the user preference data store 1060 and/or logical set operation database 1100 might be combined and/or linked to each other within the program 1015.

Figure 11:
FIG. 11 is a portion of a logical operation database that might be provided according to some embodiments.

Referring to FIG. 11, a table is shown that represents the logical set operation database 1100 that may be stored at the logical set operator platform 1000 according to some embodiments. The table may include, for example, entries identifying data objects that may be used by the system. The table may also define fields 1102, 1104, 1106, 1108, 1110, 1112 for each of the entries. The fields 1102, 1104, 1106, 1108, 1110, 1112 may, according to some embodiments, specify: a user action identifier 1102, a source application 1104, an item set 1106, selected sub-set of items 1108, a logical set operation 1110, and a resulting item set 1112. The logical set operation database 1100 may be created and updated, for example, based on information electronically received from source applications and/or users (e.g., via interactive graphical displays).

The user action identifier 902 may be, for example, a unique alphanumeric code identifying a user action that facilitates selection of an item and/or sub-set of items for the source application 1104. The item set 1106 might indicate the total set of items that was originally presented to a user, and the selected sub-set of items 1108 might represent which of the items in the item set 1106 were selected by the user. For example, as illustrated by the first entry in the table, a user was originally shown items $I_A$, $I_B$, $I_C$, and $I_D$ (that is, the item set 1106). He or she then selected $I_A$ and $I_D$ as the selected sub-set of items 1108. The logical set operation 1110 is the operation that user wants to the apply to the item set 1106 and selected sub-set of items 1108, and the resulting item set 1112 represents the result of applying that operation. For example, as illustrated by the first entry in the table, a user chose to apply an "ALL BUT SELECTED" operation and the resulting item set 1112 is $I_B$ and $I_C$ (because those were the two items in the original item set 1106 that were not included in his or her selected sub-set of items 1108).

Figure 12:
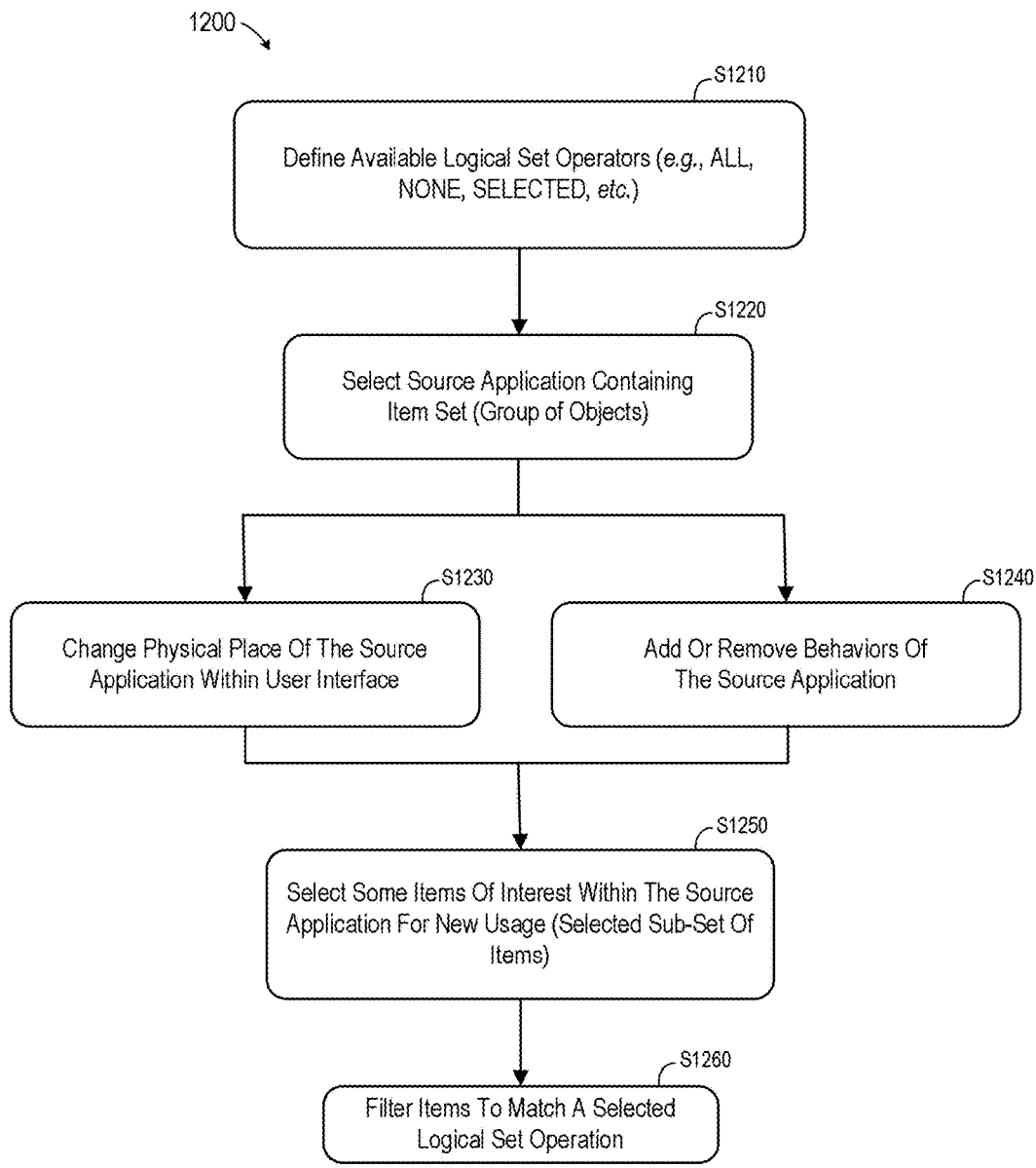
FIG. 12 is a more detailed process diagram example in accordance with some embodiments.

FIG. 12 is a more detailed process diagram example 1200 in accordance with some embodiments.

At S1210, available logical set operators may be defined (e.g., ALL, NONE, SELECTED, etc.). Note that these available operators may be defined at the time the time a logical set operator platform is created (while they were not defined when a source application was created). At S1220, a source application containing an item set may be selected (e.g., the item set might comprise a group of files or other objects). According to some embodiments, at S1230, a physical place of the source application within the user interface may be changed (e.g., by a user dragging-and-dropping a graphic associated with the source application as illustrated in FIGS. 5 and/or 7). Similarly, at 1240 behaviors of the source application may be added to or removed from the source application.

At S1250, some of interested may be selected by the user within the source application for new usage (e.g., to create a selected sub-set of items). This may be done, for example, as illustrated in FIG. 4. At S1260, items may be filtered to match a logical set operation. For example, the logical set operation selected in FIG. 8 may be applied to create the resulting item set illustrated in FIG. 9.

Thus, embodiments might be utilized in terms of a selection procedure where items can be selected either by using some search and/or filter operations, or by using a pointing device and some visual user interface selection controls (e.g., checkboxes or checkboxes). Moreover, a usage model may be provided that encompasses a user interaction in a general way such that an application of logical set operations can be embedded dynamically in any application context or user interface. According to some embodiments, an end user or an administrator may define which particular logical set operations should be available within a given computing environment, or (even more precisely) in which category of applications or in which individual application. After the usage model is defined and provided as part of a software solution, either by default or by way of a configuration selection, it may be applied to any set or sub-set of items on-the-fly (e.g., at run time). Moreover, a user might choose to subscribe to the usage model in terms of a service, in order to apply the service to item sets in applications that were not originally designed to enable these kinds of logical set operations.

As compared to predefined, hard-coded implementations that rely on the spatial arrangement of user interface controls and items, some embodiments described herein may apply logical set operations in highly dynamic and flexible ways, and such operations may be combined on-the-fly for multiple sets and/or application which were not previously designed to be support these operations. In this way, some embodiments may let a user spontaneously and dynamically choose to access the proposed usage model to apply the set operations (even if it was not pre-conceived for the particular applications that carry the item sets).

Note that embodiments described herein might define a sub-set from an item set according to logical operations (which may be labelled as the selection of item sub-sets) and/or apply a sub-set definition spontaneously to any item set within a given work environment. Moreover, embodiments may combine logical set operations spontaneously to create item sub-sets that originate from multiple item sets The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

Figure 13:
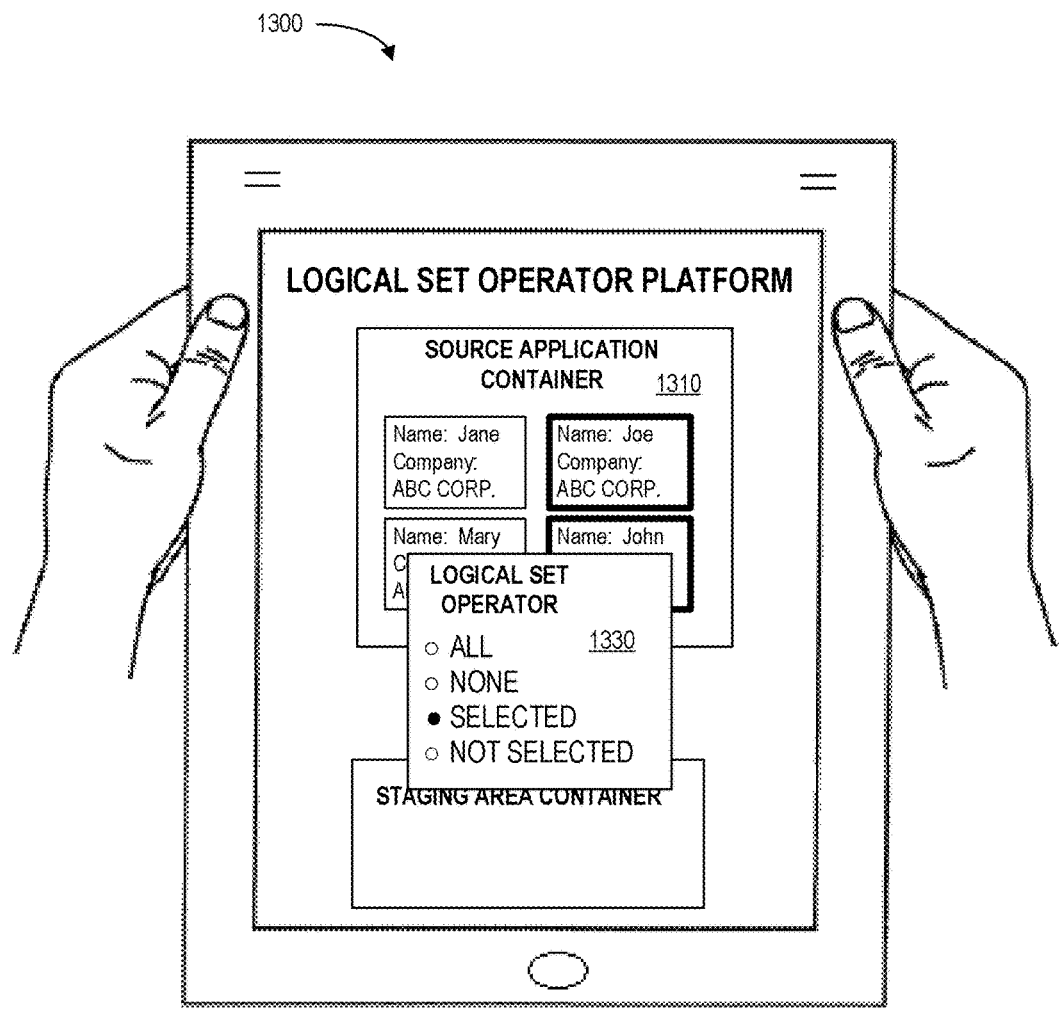
FIG. 13 illustrates a tablet or handheld computer being used according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or any of the embodiments might be implemented using a cloud based computing platform). Moreover, although embodiments have been described with respect to particular types of data structures and attribute characteristics, embodiments may instead be associated with other types of data (e.g., additional information might be collected and/or automatically used about source application containers, staging containers, etc.). Still further, the displays and devices illustrated herein are only provided as examples, and embodiments may be associated with any other types of user interfaces. For example, FIG. 13 illustrates a tablet or handheld computer 1300 being used according to some embodiments. In particular, computer 1300 includes a display 1310 with a source application container 1310 and a list of potential logical set operators 1330. In this way, a user might utilize a touch sensitive screen to select a logical set operator that will be automatically applied to items in the source application container 1310 to create a resulting item set.

According to some embodiments, data may be used in conjunction with one or more models to take into account a large number of items, types of items, and/or logical set operations. For example, the system might suggest that a particular logical set operation be employed in a particular situation based on the user's past decisions (or the decisions of other users in similar situations). The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior examples and outcomes known to an enterprise. The specific data and outcomes analyzed may vary depending on the desired functionality of the particular predictive model. The particular parameters selected for analysis in the training process may be determined by using regression analysis and/or other statistical techniques known in the art for identifying relevant variables and associated weighting factors in multivariable systems.

Embodiments described herein are solely for the purpose of illustration. Those in the art will recognize other embodiments may be practiced with modifications and alterations to that described above.

What is claimed is:

1. A system, comprising:
   a communication port to receive information from a user via a graphical user interface; and
   a logical set operator platform, coupled to the communication port, including:
   a memory storing processor-executable program code, and
   a processor to execute the processor-executable program code in order to cause the logical set operator platform to:
   recognize that a user has selected, via the graphical user interface, a sub-set of items from an item set associated with a source application,
   receive an indication from the user that a selected logical set operation is to be applied to the item set and to the selected sub-set of items, wherein the selected logical set operation is not implemented by the source application and is selected by the user from a list of potential logical set operations that includes all of: (i) an ALL operation such that the resulting item set includes all of the items in the item set, (ii) a NONE operation such that the resulting item set includes no items, (iii) a SELECTED operation such that the resulting item set includes only those items in the selected sub-set of items, and (iv) an ALL BUT SELECTED operation such that the resulting item set includes only those items in the item set that are not in the selected sub-set of items,
apply the selected logical set operation to create a resulting item set based on the selected sub-set of items, and
arrange for an indication of the resulting item set to be provided to a receiving application.

2. The system of claim 1, wherein receiving the indication from the user includes a graphical drag-and-drop operation from a graphical source container of the source application to a staging area container.

3. The system of claim 2, wherein receiving the indication from the user further includes a graphical drag-and-drop operation from a staging area container back to the graphical source container of the source application.

4. The system of claim 1, wherein application of the selected logical set operation is embedded dynamically and performed in any source application context.

5. The system of claim 1, wherein the logical set operator platform is further to, prior to receiving the indication from the user that the selected logical set operation is to be applied, verify at least one of: (i) a computing environment, (ii) a category of applications, and (iii) a particular application.

6. The system of claim 1, wherein the user subscribes to the logical set operator platform as a service.

7. The system of claim 1, wherein the item set is associated with at least one of: (i) a list of items identifiers, (ii) a table of item identifiers, and (iii) an array of item identifier tiles.

8. The system of claim 1, wherein the source application uses the indication of the resulting item set to perform an action on the items within the resulting item set.

9. The system of claim 8, wherein the action is associated with at least one of: (i) creating, (ii) reading, (iii) updating, and (iv) deleting.

10. The system of claim 1, wherein the selected logical set operation is associated with a query expression.

11. The system of claim 10, wherein each item in the item set has a characteristic field and associated characteristic field value, and the query expression is based on the characteristic field value.

12. The system of claim 11, wherein the logical set operator platform displays a list of available characteristic fields to the user and the user selects a characteristic field to be used for the query expression.

13. The system of claim 1, wherein the logical set operator platform accesses a plurality of item sets and the logical set operation is performed on the plurality of item sets.

14. The system of claim 13, wherein the logical set operation is associated with at least one of: (i) a union operation, (ii) an intersection operation, and (iii) a compliment operation.

15. A computer-implemented method, comprising:
recognizing, by a logical set operator platform, that a user has selected, via a graphical user interface, a sub-set of items from an item set associated with a source application;
receiving, at the logical set operator platform, an indication from the user that a selected logical set operation is to be applied to the item set and to the selected sub-set of items, wherein the selected logical set operation is not implemented by the source application and is selected by the user from a list of potential logical set operations that includes all of: (i) an ALL operation such that the resulting item set includes all of the items in the item set, (ii) a NONE operation such that the resulting item set includes no items, (iii) a SELECTED operation such that the resulting item set includes only those items in the selected sub-set of items, and (iv) an ALL BUT SELECTED operation such that the resulting item set includes only those items in the item set that are not in the selected sub-set of items;
applying the selected logical set operation to create a resulting item set based on the selected sub-set of items; and
arranging for an indication of the resulting item set to be provided to a receiving application.

16. The method of claim 15, wherein receiving the indication from the user includes both: (i) a graphical drag-and-drop operation from a graphical source container of the source application to a staging area container, and (ii) a graphical drag-and-drop operation from a staging area container back to the graphical source container of the source application.

17. A non-transitory, computer-readable medium storing program code, the program code executable by a processor of logical set operator platform to cause the processor to:
recognize that a user has selected, via a query expression in a graphical user interface, a sub-set of items from an item set associated with a source application;
receive an indication from the user that an ALL BUT SELECTED operation is to be applied to the item set and to the selected sub-set of items, wherein the ALL BUT SELECTED operation is not implemented by the source application and creates a resulting item set that includes only those items in the item set that are not in the selected sub-set of items, and further wherein receiving the indication from the user includes a graphical drag-and-drop operation from a staging area container back to a graphical source container of the source application;
apply the ALL BUT SELECTED operation to create a resulting item set based on the selected sub-set of items; and
arrange for an indication of the resulting item set to be provided to a receiving application.

* * * * *